(12) United States Patent
Backowski et al.

(10) Patent No.: US 6,776,612 B2
(45) Date of Patent: Aug. 17, 2004

(54) OVEN CONVEYOR AND METHOD THEREOF

(75) Inventors: Paul Backowski, Austin, TX (US); James Cashiola, Austin, TX (US); T. Clay McLaughlin, Austin, TX (US)

(73) Assignee: Austin's Pizza, Houston, TX (US)

( * ) Notice: Subject to any disclaimer, the term of this patent is extended or adjusted under 35 U.S.C. 154(b) by 0 days.

(21) Appl. No.: 10/346,573

(22) Filed: Jan. 17, 2003

(65) Prior Publication Data

US 2004/0043348 A1 Mar. 4, 2004

Related U.S. Application Data

(60) Provisional application No. 60/406,832, filed on Aug. 29, 2002.

(51) Int. Cl.[7] .................................................. F27D 3/04
(52) U.S. Cl. ..................... 432/126; 432/195; 99/443 R
(58) Field of Search ................................ 432/121, 126, 432/195, 239, 246, 192; 99/360, 362, 443 R, 443 C

(56) References Cited

U.S. PATENT DOCUMENTS

| | | | | | |
|---|---|---|---|---|---|
| 3,502,310 | A | * | 3/1970 | Coffman | 432/10 |
| 3,584,847 | A | * | 6/1971 | Hammond et al. | 432/86 |
| 3,684,258 | A | * | 8/1972 | Coffman et al. | 432/11 |
| 4,306,857 | A | * | 12/1981 | Hofstetter et al. | 432/121 |
| 4,389,562 | A | * | 6/1983 | Chaudoir | 219/388 |
| 4,432,214 | A | * | 2/1984 | Richelli et al. | 62/341 |
| 4,664,923 | A | * | 5/1987 | Wagner et al. | 426/233 |
| 5,104,314 | A | * | 4/1992 | Amore | 432/121 |
| 5,339,727 | A | * | 8/1994 | Fessmann | 99/482 |

* cited by examiner

*Primary Examiner*—Gregory Wilson
(74) *Attorney, Agent, or Firm*—Raymond M. Galasso; Simon, Galasso & Frantz PLC

(57) ABSTRACT

A oven conveyor system is disclosed herein. In use, items to be heated are placed in contact with a hearth, and then moved across the hearth by the conveyor. The conveyor system allows the items to maintain contact with the hearth while being conveyed. A large volume of items may be heated while still obtaining the beneficial heating characteristics of a hearth-type oven.

24 Claims, 7 Drawing Sheets

OVEN CONVEYOR AND METHOD THEREOF

CROSS REFERENCE TO RELATED APPLICATIONS

This application claims benefit under 35 U.S.C. §119 of U.S. provisional patent application Serial No. 60/406,832, entitled Masonry Oven With Conveyor And Method Thereof, which was filed on Aug. 29, 2002.

FIELD OF THE DISCLOSURE

This disclosure relates generally to ovens, and more particularly to ovens with conveyors.

BACKGROUND

Most currently available culinary ovens can be divided into two main categories: 1) hearth-type ovens used primarily to ensure that cooked food has a preferred taste and texture; and 2) production ovens used primarily to provide a maximum volume of cooked items. Many people believe that the heating characteristics of masonry ovens are at least partly responsible for giving prepared food a unique flavor. However, in many circumstances it is not practical to use a conventional hearth-type oven, because specially trained oven operators are needed to achieve optimum results. These operators must closely watch and carefully tend the food during cooking, and as a result only limited amounts of food can be prepared at any one time.

Because of the limited capacity of conventional hearth-type ovens, high volume restaurants such as many pizzerias opt for forced-air or similar production ovens that employ conveyor systems. The conveyor systems used in production ovens allow pizzas to be produced in the large quantities necessary to meet customer demand. However, increased volume comes at the expense of losing the unique flavor and texture imparted to food cooked in hearth-type ovens.

In addition to lacking the desirable flavor and texture of hearth-type ovens, many production ovens' heating characteristics are less than perfect. For example, when a large number of pizzas are cooked at the same time in most conventional production ovens, the temperature of the oven drops. When the oven temperature drops, the ovens automatic temperature compensation system attempts to compensate for the temperature drop by increasing the temperature of the oven. If a single pizza is cooked immediately after a large batch of pizzas has just been cooked, the single pizza will be burned.

Conventional hearth-type ovens impart a unique flavor and texture to food, but are unable to economically satisfy the need for high-quantity production. In contrast, although production ovens can satisfy high-quantity production requirements, they have less than ideal heating characteristics and cannot impart to food the desirable texture and flavor produced by hearth-type ovens. Clearly, it would be advantageous if a way could be found to prepare large quantities of food efficiently, while at the same time obtaining the flavor and texture obtained by hearth-type ovens.

BRIEF DESCRIPTION OF THE DRAWINGS

Various advantages, features and characteristics of the present disclosure, as well as methods, operation and functions of related elements of structure, and the combination of parts and economies of manufacture, will become apparent upon consideration of the following description and claims with reference to the accompanying drawings, all of which form a part of this specification.

DETAILED DESCRIPTION OF THE FIGURES

FIGS. 1–7 illustrate an oven with a conveyor according to various embodiments of the present disclosure. The oven, which in at least one embodiment is a masonry oven, includes an oven chamber, a hearth within the oven chamber and a conveyor to move an item to be heated through the oven chamber. In use, an item to be heated is placed on the hearth through an opening in the oven chamber, such that the item to be heated is in contact with the hearth. The conveyor moves the item through the oven chamber, from the entrance to the exit, without causing the item to lose contact with the hearth, so that the item is in contact with the hearth the entire time it is moving through the oven chamber. After the item is heated, it is removed from the hearth through an exit opening in the oven chamber. By ensuring that the item to be heated maintains contact with the hearth as it is moved through the oven chamber by the conveyor, the item is heated in a manner similar to the manner in which it would be heated if the item were placed in a conventional hearth-type oven. In this way the flavor, texture or other characteristics imparted to food cooked in a conventional hearth-type oven may also be imparted to foods heated according to the teachings set forth herein.

As used in the following disclosure the term "conveyor" is used in its broadest sense of an apparatus that conveys, or moves, an item along a path from a starting point to an end point. The starting point and end point may be the same physical location, such as when an item is placed in an oven through an opening, moved through the oven and back to the opening to be removed from the oven. Alternatively, the path along which the conveyor moves the item may begin at one physical location such as the entrance of a tunnel-type oven, and end at another physical location such as the exit of a tunnel type oven. In addition, it should be appreciated that although the terms "masonry oven," "masonry hearth," etc. are used in the following description of the figures, these terms are often used as shorthand to refer to hearths and hearth-type ovens generally.

Figure 1:
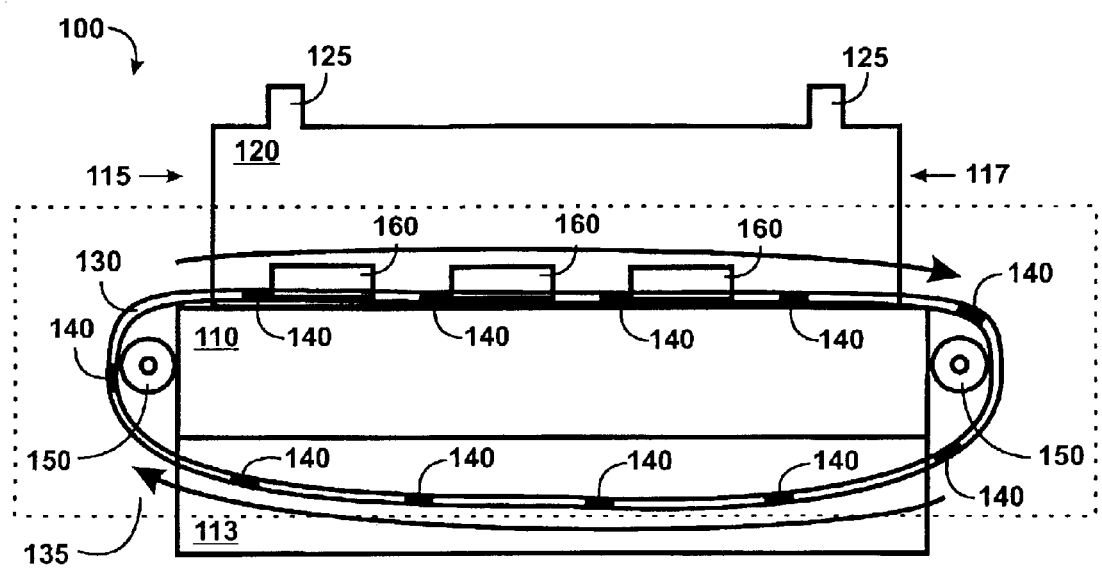
FIG. 1 is a cut away side elevation of an oven with a conveyor system according to an embodiment of the present disclosure.

Referring first to FIG. 1, an oven with a conveyor system is illustrated according to an embodiment of the present disclosure, and designated generally Oven 100. Oven 100 includes Oven Chamber 120, Masonry Hearth 110 and Conveyor System 135. Oven Chamber 120 includes First Opening 115 to serve as a product entrance, Second Opening 117 to serve as a product exit, and flue 125 to serve as an exhaust for Oven Chamber 120. Masonry Hearth 110, the construction of which will be described in greater detail subsequently, is generally formed of soapstone, brick, rock, clay or some other heat resistant masonry material, and serves as a direct heating element for items placed thereon. However, other suitable materials, such as various ceramic material may be used instead. Support Structure 113 is used to maintain Masonry Hearth 110 above ground level.

Conveyor System 135 includes Drive Loop 130 having Movement Members 140 attached thereto, and Drive Mechanisms 150. Drive Mechanism 150 drives Drive Loop 130 about Masonry Hearth 110. Drive Loop 130 in turn moves Movement Members 140 to push or otherwise move Items To Be Heated 160 through Oven Chamber 120. Items 160 are placed on Masonry Hearth 110 at Entrance 115 and pushed through Oven Chamber 120 by Movement Members 140, until Items 160 leave Oven Chamber 120 through Exit Opening 117. Note that items 160 are moved through Oven Chamber 120 while maintaining contact with Masonry Hearth 110.

By maintaining contact with Masonry Hearth 110, items 160 are heated in the same manner as items placed within a conventional masonry oven. For example, if a pan-type pizza were cooked in a conventional masonry oven, the pan containing the pizza would be placed on top of the masonry hearth and left in contact with the hearth during the time it is being cooked, except for possibly short periods of time when the pan is being turned by an oven operator. Likewise, if a pan-type pizza is placed on Masonry Hearth 110 as illustrated by Items 160 in FIG. 1, the pan pizza would be pushed through Oven Chamber 120, all the while maintaining contact with Masonry Hearth 110. This heating method is in sharp contrast to metal type ovens, in which the pan would be placed on a conveyor and moved through the air suspended over a heat source.

It will appreciated that Items 160 are not limited to pan-type pizza's, but may be other food stuffs known to those skilled in the culinary arts suitable for being heated, cooked, baked, etc. in an oven. In addition, although FIG. 1 illustrates a tunnel shaped masonry oven, with a conveyor that moves items through the oven chamber in a relatively linear fashion from one opening in the oven chamber to another opening in the oven chamber, other embodiments of the present disclosure may be constructed in which the conveyor moves items placed on a masonry hearth in a non-linear manner, or moves items placed on a masonry hearth from one opening, through a masonry oven, and back to that same opening, without departing from the spirit and scope of the present disclosure.

Figure 2:
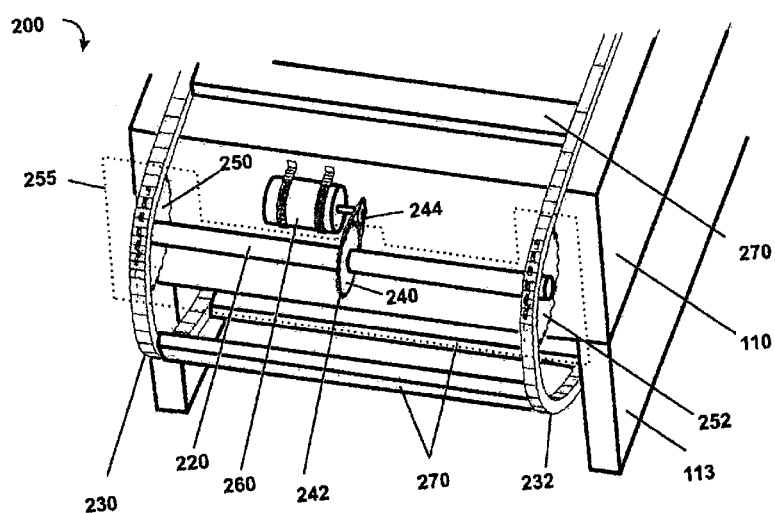
FIG. 2 is a perspective view of a conveyor system according to an embodiment of the present disclosure.

Referring next to FIG. 2, a conveyor system is illustrated according to an embodiment of the present disclosure, and is designated generally as Conveyor System 200. Conveyor System 200 is shown in place around Masonry Hearth 110, supported on Support Structure 113. Conveyor System 200 includes Left Drive Loop 230 positioned around a left side of Masonry Hearth 110, and Right Drive Loop 232 positioned around a right side of Masonry Hearth 110. Horizontal Members 270 are connected to Drive Loops 230 and 232, and serve to engage a product (not shown) placed on Masonry Health 10 and move the product across Masonry Hearth 110 while allowing the product to maintain surface contact with the Hearth. Drive Loops 230 and 232 are moved by Sprocket Assembly 255. Sprocket Assembly 255 includes Sprockets 250 and 252, Drive Sprocket 240 and Bar 220, which connects Sprockets 250, 240 and 252. Motor 260 includes a Sprocket 244, which is connected to Sprocket Assembly 255 by Motor Chain 242. Motor 260 rotates Sprocket Assembly 255 about the longitudinal center axis of Bar 220.

In at least one embodiment, Drive Loops 230 and 232 are chains which engage teeth on Sprockets 250 and 252. However, in other embodiments Drive Loops 230 and 232 may be metal bands that engage Sprockets 250 and 252 using holes formed in the metal bands. Alternatively, Drive Loops 230 and 232 may be constructed of other suitable heat resistant materials, and configured to engage Sprockets 250 and 252 using friction or other suitable means known to those skilled in the art.

Horizontal Members 270 are, in one embodiment, metal bars connected to Drive Loops 230 and 232 using rivets, bolts, screws, pins, welds or other suitable fastening means. Bars 270 may be round, square, triangular or another suitable shape determined to be useful in engaging a product placed on Masonry Hearth 110, and to facilitate movement of the product across Masonry Hearth 110. In at least one embodiment, Horizontal Members 270 include clips (not illustrated) or other grasping means to permit attachment to containers placed on Masonry Hearth 110, such that the containers may be pushed, pulled, dragged, slid or otherwise moved across Masonry Hearth 110 while maintaining contact with Masonry Hearth 110. Upon consideration of the teachings set forth herein, it will become apparent that while a particular style of conveyor system is illustrated in FIG. 2, other styles of conveyor systems may be employed consistent with the teaching set forth herein, provided the conveyor systems permit items placed on Hearth 110 to remain in contact with Hearth 110 while the items are being conveyed through the oven chamber.

Figure 3:
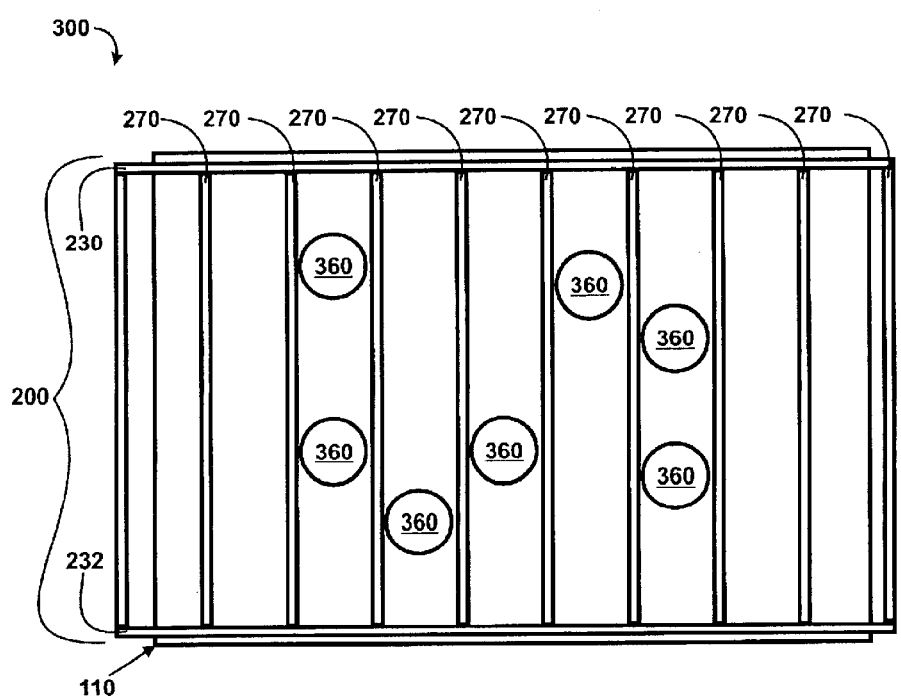
FIG. 3 is a top view of a conveyor system-moving product across a hearth according to an embodiment of the present disclosure.

Refer next to FIG. 3, which illustrates a number of items being conveyed across a masonry hearth according to an embodiment of the present disclosure. FIG. 3 shows Masonry Hearth 110, which is located within an Oven Chamber (not shown). Conveyor System 200, which includes Drive Loops 230 and 232 and Horizontal Cross Members 270, is shown moving Products 360 across Masonry Hearth 110. Note that in the illustrated embodiment, a large number of products can be moved across Masonry Hearth 110, thereby permitting large quantities of food to be cooked in a masonry oven. Since the thermal mass of a masonry oven is so great, the temperature within the oven chamber (not illustrated) does not vary significantly when relatively large quantities of food are heated on Masonry Hearth 110. In addition, the thermal mass of Masonry Hearth 110 ensures that the bottom of any item placed thereon is heated sufficiently to provide a desired level of cooking.

It will be appreciated that the taste, texture, consistency, color and other characteristics of items cooked using the teachings set forth herein may depend on the temperature of the chamber through which the food items are being conveyed, and the rate at which the items are conveyed therethrough. In at least one embodiment, controllers are used to automatically control the temperature of the oven chamber and the rate at which Conveyor 200 moves items across Masonry Hearth 110.

Figure 4:
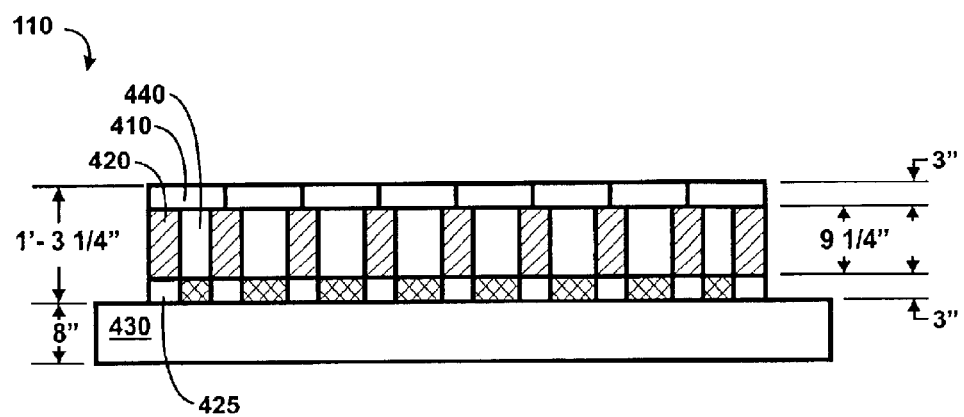
FIG. 4 is a side elevation of a hearth according to an embodiment of the present disclosure.

Referring next to FIG. 4, a masonry hearth is illustrated according to an embodiment of the present disclosure, and designated generally as Hearth 110. Hearth 110 is formed on Heat Chamber Slab 430, which is the bottom of an oven chamber according to an embodiment of the present disclosure. Clipper Brick Support Spacers 425 are placed on top of Heat Chamber Slab 430. Insulating Concrete is then poured around the Clipper Brick Supports 425. In at least one embodiment Clipper Brick Support Spacers 425 are firebricks. Clipper Brick Supports 420, which may also be firebricks, are then placed on top of Clipper Brick Support Spacers 425 to serve to support the top surface of Hearth 110, and raise the top of Hearth 110 above Heat Chamber Slab 430, thereby forming a Secondary Heat Chamber 440 within the oven chamber (not shown). The top of Hearth 110 is formed of clipper bricks laid across Clipper Brick Supports 420. Note that although Clipper Bricks are used in the illustrated embodiment, other types of masonry products such as soapstone, fire bricks or other similar materials may be used to achieve desired cooking properties based on the heat transfer characteristics of the material selected.

Figure 5:
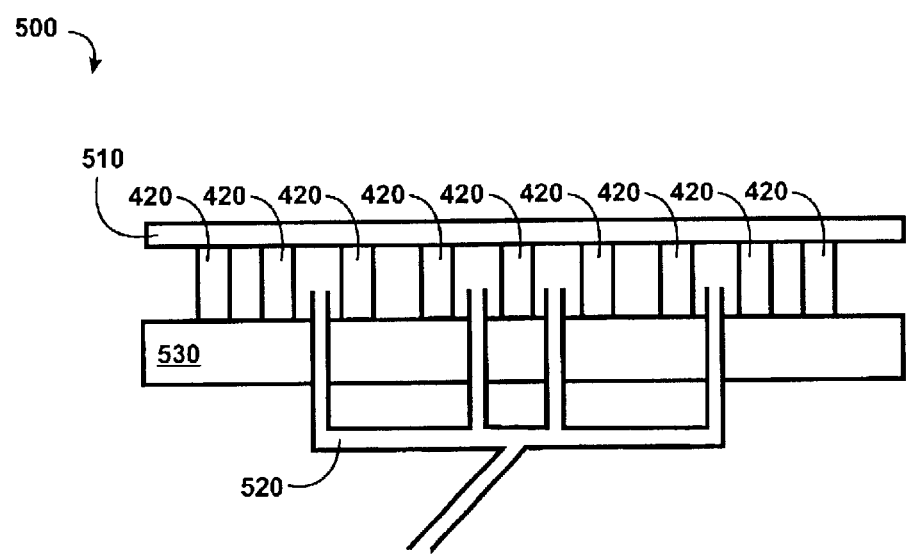
FIG. 5 is a side elevation showing how heat may be applied to the hearth of FIG. 4 according to an embodiment of the present disclosure.

Referring next to FIG. 5 a masonry hearth with an associated gas manifold is illustrated, and designated generally as Hearth 500. Hearth 500 includes a Top 510 supported by Clipper Brick Supports 420 on top of a Heat Chamber Slab 530. Heat Chamber Slab 530 has openings formed therein to permit insertion of Manifold 520. In at least one embodiment, Top 510 is heated from underneath, using gas burners (not shown). The gas supply for these burners is provided by Manifold 520. By heating the Top 510 of Hearth 500 from underneath, the masonry product of which Top 510 is constructed will more evenly distribute the heat, thereby improving the cooking characteristics of Masonry Hearth 510, as compared to cooking methods not employing a masonry hearth.

Figure 6:
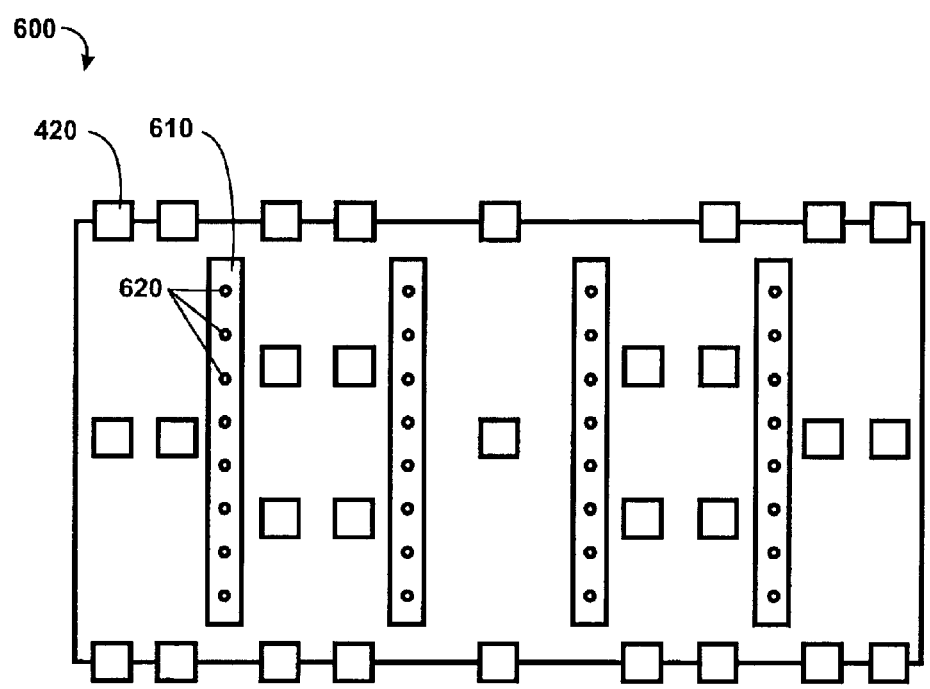
FIG. 6 is a top view of burners used to heat a hearth according to an embodiment of the present disclosure.

Referring next to FIG. 6, the gas burners attached to Manifold 520 (see FIG. 5) are illustrated according to an embodiment of the present disclosure. FIG. 6 shows a top down view of Masonry Hearth 600 with the top of the masonry hearth removed. The squares represent Supports 420 used to support the top of Masonry Hearth 600 (see FIG. 5). Burners 610 include Holes 620 through which gas may pass, and be ignited to heat Masonry Hearth 600. Each of the Burners 610 is connected to Manifold 520 using methods well known to those in the art.

The flow of gas through Manifold 620, and therefore the delivery of heat to Hearth 600, may be automatically controlled by an external controller (not shown) as known to those skilled in the art. This external controller may be set such that the temperature of the oven chamber will be maintained within a desired range, for example between 500 and 510 degrees. In the illustrated embodiment, heat is applied to the underside of the top of the masonry hearth, such that sharp changes in temperature within the oven chamber can be avoided. However, although a particular method of applying heat to Hearth 600 is illustrated in FIG. 6, other methods known to those skilled in the art may be employed without departing from the spirit and scope of the present disclosure. For example, the oven disclosed herein can be readily adapted to allow the use of wood fuel instead of using natural gas as illustrated.

In at least one embodiment of the disclosure four burners rated at approximately 65,000 BTU are used, and may be powered using either propane or natural gas. The dimensions of the burners are 1½"×45" and they are flame length type T burners with N.S.D. drilling.

Figure 7:
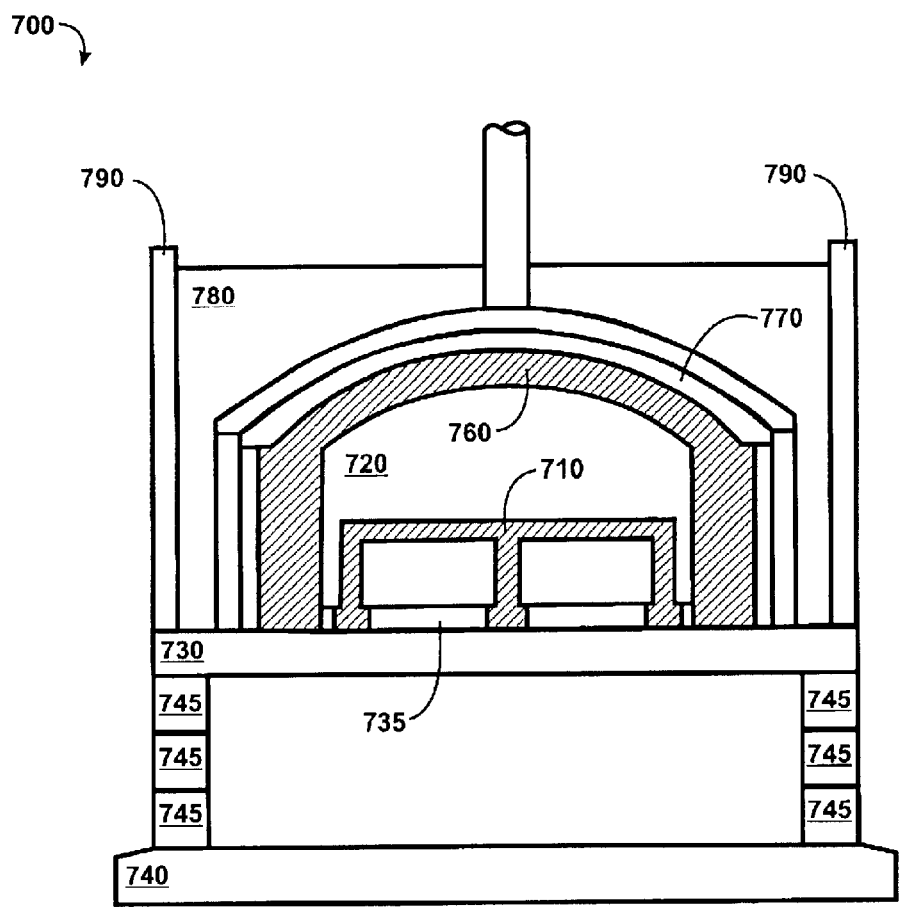
FIG. 7 is a front view of a masonry oven according to an embodiment of the present disclosure.

Referring next to FIG. 7, an end view of a masonry oven according to an embodiment of the present disclosure is illustrated and designated generally Oven 700. Note that a conveyor is not illustrated in FIG. 7, for ease of discussion. Oven 700 includes Support Slab 740, Support Structure 745, Heat Chamber Slab 730, Heat Chamber 720 and Masonry Hearth 710. A conveyor (not illustrated) moves items placed on Hearth 710 through Oven Chamber 720 and out an exit (not shown) at the back of Oven 700. As noted earlier, the thermal mass of Oven 700 contributes to its advantageous heating properties, such that when combined with a conveyor (not shown), large quantities of food can be heated while still obtaining the benefits of cooking in a masonry oven.

The Masonry Oven 700 illustrated in FIG. 7 is constructed on a Support Slab 740. In at least one embodiment, Support Slab 740 is approximately 14½' long, 9' wide, and about 8" thick. The construction of a concrete slab such as Slab 740 is well known in the art.

Support Structure 745 may be constructed of standard concrete blocks measuring 8"×8"×16", or 4"×8"×16", and composed of Portland cement. The concrete blocks are filled and laid in overlapping courses, as commonly known to those skilled in the art, and may be reinforced with re-bars or otherwise as desired. In at least one embodiment, the concrete blocks run the entire length of Support Slab 740 on either side of the slab, leaving a center portion of the Support Slab 740 open.

Heat Chamber Slab 730 is placed on top of Support Structure 745 Heat Chamber 730 is, in at least one embodiment, approximately 10'11" long, 8'6" wide and approximately 7⅝" thick. When forming Heat Chamber Slab 730, in at least one embodiment four PVC pipes are put in place towards the center of Heat Chamber Slab 730 to permit future placement of a gas manifold as previously discussed.

Oven Chamber 720 is constructed on top of Heat Chamber Slab 730, and may have an inner layer formed of firebrick or another suitable heat resistant masonry material. Outside of the firebrick layer 760, a foil layer is placed prior to pouring one or more layers 770 of calcium aluminate concrete. Outside of the calcium aluminate layer 770 a layer of loose fill perlite 780 is formed and held in place by a stud wall 790.

The fire bricks used in constructing Oven 700 are in one embodiment Butler™ fire bricks that have a nominal size of 2⅝"×4½"×9" and a nominal weight of approximately 7.5 pounds. The firebricks are approximately 75–85% aluminum silicates by weight and approximate 0–5% of iron compounds by weight. The Clipper firebricks used to form the masonry hearth have a nominal size of approximately 3"×12"×24" and a nominal weight of 71 pounds. The Clipper firebricks comprise 1302-93-8 aluminum silicate (approximately 60–100% by weight) and 144464-46-1 crystalline silica (about 20–30% by weight).

Mortar used for setting the firebricks on the ceiling of Oven Chamber 720 comprises fire clay, Portland cement and sand. The mortar for the firebricks on the walls of Oven Chamber 720 is a pre-mixed mortar sold by Acme Brick™ in Round Rock, Tex. under the name of Everset™. The Everset™ mortar is composed primarily of crystalline silica. High heat concrete, such as used in Calcium Aluminate Layer 770 surrounding Firebrick Layer 760 includes a mixture of calcium aluminate, pea gravel and sand. The insulating concrete layer 735 above Heat Chamber Slab 730 includes perlite and calcium aluminate. It will be appreciated that perlite is essentially amorphous aluminate silicate.

In the preceding detailed description of the figures, reference has been made to the accompanying drawings, which form a part thereof, and in which is shown by way of illustration specific embodiments in which the invention may be practiced. These embodiments are described in sufficient detail to enable those skilled in the art to practice the disclosure, and it is to be understood that other embodiments may be utilized and that logical, mechanical, chemical, and electrical changes may be made without departing from the spirit or scope of the disclosure. For example, the above disclosure focuses primarily on a tunnel shaped oven having an entrance opening and an exit opening in the oven chamber. Other embodiments may be constructed which utilize only a single opening.

Additionally, various materials used in construction of an oven according to the illustrated embodiments have been disclosed. For example, although the detailed description above focuses on hearths constructed of masonry material such as brick, soapstone, etc., various embodiments of a hearth could be constructed of ceramics or other suitable material. The ceramic, masonry, or other hearth constructed according to the teachings set forth herein could be used in a metal, ceramic, brick or other oven type as desired.

Those skilled in the art of oven construction could easily change the dimensions or material composition of the oven chamber to produce various heating characteristics for use with different items to be baked. For example an oven configured to produce ideal cooking of a pizza may benefit from a different chamber configuration than an oven used primarily for baking loaves of bread. Accordingly, the present disclosure is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is defined only by the appended claims.

What is claimed is:

1. An oven comprising:
   an oven chamber including:
     a hearth at least partially disposed within a heated cavity of the oven chamber;
     a product entrance to permit placement of an item to be heated in contact with the hearth;
     a product exit to permit removal of the item from contact with the hearth after heating; and
   a conveyor to move the item through the oven chamber from the product entrance to the product exit, wherein the conveyer is configured in a manner wherein the item remains in direct contact with the hearth while being moved by the conveyor through the oven chamber from the product entrance to the product exit.

2. The oven as in claim 1, wherein the product entrance is a first opening in the oven chamber and the product exit is a second opening in the oven chamber.

3. The oven as in claim 2, wherein the first opening opposes the second opening.

4. The oven as in claim 1, wherein the conveyor includes:
   a first drive loop positioned lengthwise about a left side of the hearth;
   a second drive loop positioned lengthwise about a right side of the hearth;
   a plurality of cross members coupled between the first drive loop and the second drive loop; and wherein
     the plurality of cross members are further positioned across a width of the hearth such that the first drive loop and the second drive loop drive the plurality of cross members along the length of the hearth, thereby pushing the item through the oven chamber.

5. The oven as in claim 1, wherein the oven chamber is heated using a heat source positioned under the hearth.

6. The oven as in claim 1, further including a temperature controller to automatically provide additional heat as needed to maintain a temperature of the oven chamber within a predetermined range.

7. The oven as in claim 1, further including a conveyor controller to control a speed at which the conveyor moves items through the oven chamber.

8. The oven as in claim 1, wherein the oven is a masonry oven.

9. The oven as in claim 1, wherein the hearth is formed of a masonry material.

10. The oven as in claim 1, wherein the hearth is formed of a ceramic material.

11. A method comprising:
   placing an item to be heated onto a hearth at least partially disposed within a heated oven chamber cavity of an oven;
   heating the item by sliding the item across the hearth ma manner whereby the item remains in direct contact with the hearth while being moved,
   wherein said sliding includes sliding the item at least partially through the heated oven chamber cavity of the oven.

12. The method as in claim 11, wherein sliding the item across the hearth includes sliding the item from a first opening in the oven to a second opening in the oven.

13. The method as in claim 12, wherein the first opening opposes the second opening.

14. The method as in claim 11, wherein sliding the item includes using a conveyor.

15. The method as in claim 14, wherein sliding the item using a conveyor includes using a cross member of the conveyor to push the item across the hearth.

16. The method as in claim 14, further including controlling a speed at which the conveyor moves the item across the hearth.

17. The method as in claim 11, wherein heating the item includes heating the hearth from underneath.

18. The method as in claim 11, further including maintaining a temperature of the oven within a predetermined range using a temperature controller to automatically provide additional heat as needed.

19. A masonry oven comprising:
   a tunnel-shaped oven chamber including:
     a first opening at a first end of said oven chamber;
     a second opening at an opposing end of said oven chamber;
   a generally rectangular masonry hearth at least partially disposed within a heated cavity of said oven chamber and traversing a length of said oven chamber, said hearth having a top, a first end, a second end, a left side and a right side; and
   a conveyor assembly including:
     a first drive loop positioned lengthwise about a left side of said hearth;
     a second drive loop positioned lengthwise about a right side of said hearth; and
     a plurality of cross members coupled between said first drive loop and said second drive loop;
     wherein the plurality of cross members are moved along the length of said oven chamber by the first drive loop and the second drive loop, thereby moving items placed on said hearth between two adjacent ones of said cross members through said oven chamber in a manner whereby said items remain in direct contact with said hearth while being moved by the conveyor assembly.

20. The masonry oven as in claim 19, wherein the conveyor assembly further includes:
   a first sprocket assembly mounted widthwise at the first end of said hearth and proximate to the first opening, the first sprocket assembly including:
     a first bar having a first end, a second end and a center axis intersecting the first and second ends thereof;

a first sprocket coupled to the first end of the first bar;

a second sprocket coupled to the second end of the first bar;

a motor coupled to the first sprocket assembly, the motor rotates the first sprocket assembly about the center axis of the first bar;

a second sprocket assembly mounted widthwise at the second end of said hearth and proximate to the second opening, the second sprocket assembly including:

a second bar having a first end, a second end and a center axis intersecting the first and second ends thereof;

a first sprocket coupled to the first end of the second bar;

a second sprocket coupled to the second end of the second bar;

wherein the first drive loop is further positioned to engage the first sprocket of the first sprocket assembly, loop under said hearth, and engage the first sprocket of the second sprocket assembly; and wherein the second drive loop is further positioned to engage the second sprocket of the first sprocket assembly, loop under said hearth, and engage the second sprocket of the second sprocket assembly.

21. The masonry oven as in claim 20, wherein:

the first sprocket assembly includes a third sprocket coupled to said bar of the first sprocket assembly;

the motor includes a sprocket; and the motor is coupled to the first sprocket assembly by a chain engaging both the sprocket on the motor and the third sprocket.

22. The masonry oven as in claim 19, wherein the oven chamber is heated using a heat source positioned under said hearth.

23. The masonry oven as in claim 19, further including a temperature controller to automatically provide additional heat as needed to maintain a temperature of said oven chamber within a predetermined range.

24. The masonry oven as in claim 19, further including a conveyor controller to control a speed at which the conveyor assembly moves items through said oven chamber.

* * * * *